United States Patent
Bassani et al.

(12) 
(10) Patent No.: US 10,133,897 B1
(45) Date of Patent: Nov. 20, 2018

(54) AIMING SYSTEM BASED ON MULTIPLE COLORS TRANSITION SPOT PATTERN

(71) Applicant: Datalogic IP Tech S.r.l., Lippo di Calderara di Reno (IT)

(72) Inventors: Marco Bassani, Lugo (IT); Luigi Iacovitti, Bologna (IT); Nicola Cuccato, Zola Predosa (IT)

(73) Assignee: Datalogic IP Tech S.r.l., Calderara di Reno (IT)

( * ) Notice: Subject to any disclaimer, the term of this patent is extended or adjusted under 35 U.S.C. 154(b) by 0 days.

(21) Appl. No.: 15/649,168

(22) Filed: Jul. 13, 2017

(51) Int. Cl.
  *G06K 7/10* (2006.01)
  *G02B 19/00* (2006.01)
  *G06K 7/14* (2006.01)

(52) U.S. Cl.
  CPC ..... *G06K 7/10732* (2013.01); *G02B 19/0014* (2013.01); *G02B 19/0061* (2013.01); *G06K 7/1417* (2013.01)

(58) Field of Classification Search
  CPC ... G06K 7/10; G06K 9/24; G02B 5/00; G06F 17/00
  USPC ....... 235/462.2, 462.01, 462.11, 462.32, 375
  See application file for complete search history.

(56) References Cited

U.S. PATENT DOCUMENTS

| | | | |
|---|---|---|---|
| 7,209,271 B2 * | 4/2007 | Lewis | G02B 26/085 235/462.32 |
| 8,181,878 B2 | 5/2012 | Nunnink et al. | |
| 9,400,906 B2 | 7/2016 | Thuries et al. | |
| 2008/0212168 A1 * | 9/2008 | Olmstead | G02B 27/0075 359/355 |
| 2015/0220766 A1 * | 8/2015 | Russell | G06K 7/10881 235/462.42 |
| 2015/0363619 A1 * | 12/2015 | Lei | G06K 7/10732 235/455 |
| 2017/0330008 A1 * | 11/2017 | Suman | G06K 7/10881 |

* cited by examiner

*Primary Examiner* — Edwyn Labaze
(74) *Attorney, Agent, or Firm* — Shook, Hardy & Bacon L.L.P.

(57) ABSTRACT

Two or more colors are used in an aiming pattern, where the high contrast between the edges of the two illuminated portions identifies the centerline of the field of view (FOV). The centerline is used as an intuitive and highly recognizable aiming pattern. The colors are generated by light sources, such as LEDs or laser diodes. The edges of the two figures produced by the light sources create a high visibility color contrast line/stripe. Additionally, the aiming pattern can be created using illuminators in the barcode reader, allowing for the barcode to maintain compactness.

14 Claims, 6 Drawing Sheets

AIMING SYSTEM BASED ON MULTIPLE COLORS TRANSITION SPOT PATTERN

CROSS-REFERENCE TO RELATED APPLICATIONS

None.

BACKGROUND OF THE INVENTION

Aiming systems are currently made with light emitting diodes (LEDs) and laser diodes that project particular light shapes aimed to clearly indicate where a device field of view (FOV) occurs. The current state of the art can be divided into two groups: Single light source devices; and double light source devices.

"Single light source" aiming systems are typically designed to project a well-defined figure that tries to indicate the center or other features of the FOV. The main limitation of this approach is that the origin of this source cannot stay in the optical axis of the device and then the projected figure may indicate only approximately the real center of the FOV. In particular, the error is higher, in relation to the width of the FOV, at short distances.

"Double light sources" aiming systems can overcome the limitations of the "single light source" aiming systems by exploiting two principles, symmetry and overlap of figures. In the case of symmetry, "double light sources" aiming systems achieve symmetrical configurations with respect to the optical axis. In this way, it is possible to generate a symmetrical figure with respect to the center of the FOV, which makes it easily identifiable. An example of the "double light sources" is the combination of two parallel laser pointers arranged symmetrically to the optical axis. The FOV center is always in the midpoint of the two laser images. Regarding the overlap principle, two light sources can overlay two figures in order to highlight some specific points of the FOV. An example of this approach is where two laser lines, which lie in the same plane, intersect each other on the optical axis and generate a cross pattern in the center of the FOV. This type of aiming system is better than a single light source aiming system, but it has the drawback of including additional hardware, increasing product costs and decreasing compactness.

SUMMARY

Embodiments of the invention are defined by the claims below, not this summary. A high-level overview of various aspects of embodiments of the invention is provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

The present invention provides a new and effective way to position a device with respect to a target reusing the light emitting diodes (LEDs) of Good Read and No Read, indicated on some optical reading devices. The idea is to use at least two LEDs, usually the green one for Good Read and the red one for No Read, turned on together, in order to generate at least two rectangular adjacent light images, whose color edge identifies a field of view (FOV) centerline. The present invention reduces product costs and improves integration.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Figure 1:
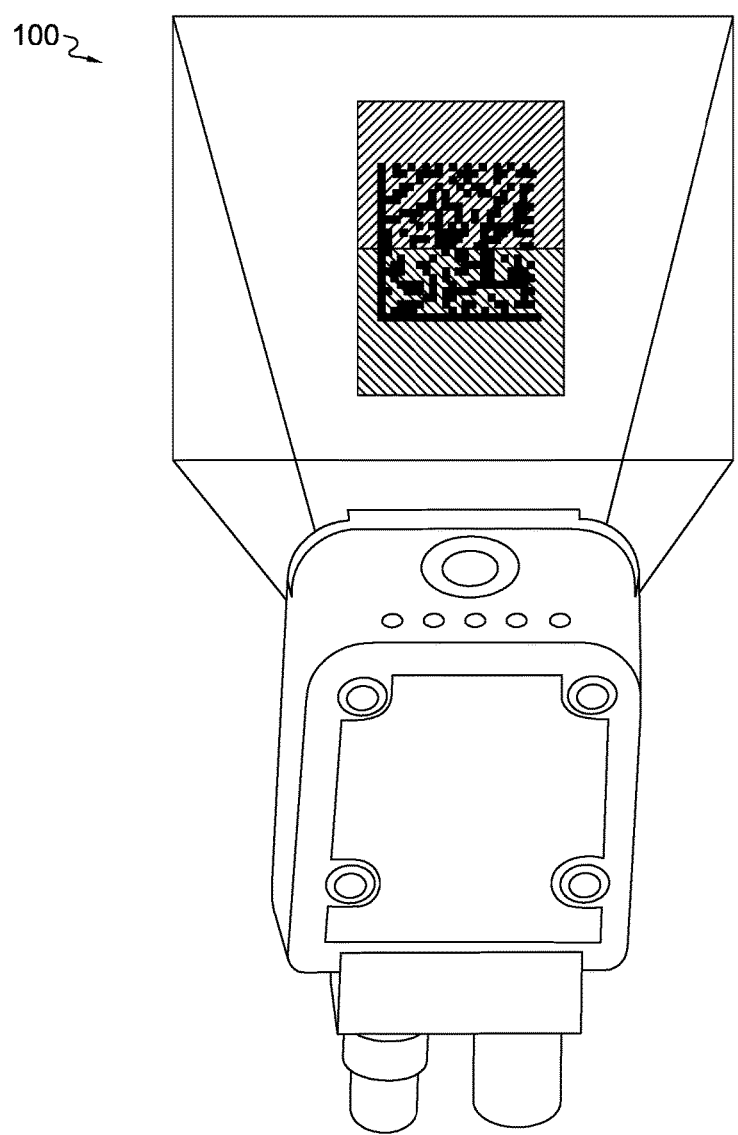
FIG. 1 is an exemplary illustration of an optical scanning system scanning an image, implemented in accordance with an embodiment of the present invention.

Embodiments of the present invention relate generally to a barcode reader that has enhanced usability and aiming to aid an operator. Accordingly, the present invention implements two or four light sources that illuminate a targeted object in different colors. The boundaries of the colors provide a contrast the indicate a centerline, giving the operator an aiming pattern that is placed over the targeted object so that the object can be read or scanned.

In a first aspect, an aiming system for a barcode reader is provided that includes a first light source emitting a first color, which illuminates a first portion of a field of view (FOV) of the barcode reader. A second light source emits a second color, which illuminates a second portion of the FOV of the barcode reader. The first light source and the second light source have different colors. Each of the first portion and second portion of the FOV is rectangular-shaped. A conjunction of the first portion and the second portion creates a single rectangular aiming pattern. A contrast between the first color and the second color creates an intuitive aiming pattern. An edge between two rectangular images created by the conjunction of the first portion and the second portion identifies a FOV centerline.

In another aspect, a method of improving an aiming pattern in a barcode reader is provided where the barcode reader has a first light source that emits a green color to indicate a reading success and a second light source that emits a red color to indicate a reading failure. Initially, in the barcode reader, when a light source is turned on, the other light source is turned off. The barcode reader is modified so that the first light source and the second light source emit respectively the green color and the red color simultaneously. The green color and the red color hit and illuminate a targeted object. The barcode reader is modified further so that each of the first light source and the second light source emit a rectangular-shaped image with the respective green color and red color. The first light source and the second light source are aligned in the barcode reader so that the rectangular-shaped image with the green color is adjacent to the rectangular-shaped image with the red color to provide a field-of-view (FOV) centerline between the two rectangular-shaped colors. The green color and the red color are read in the FOV of the barcode reader. This reading occurs when the color images are reflected back into the sensor of the barcode reader. An optimal reading is performed when the FOV centerline hits the targeted object.

In yet another aspect, an aiming system for a barcode reader is provided that includes a first light source emitting a first color, which illuminates a first portion of a field of view (FOV) of the barcode reader. A second light source emits a second color, which illuminates a second portion of the FOV of the barcode reader. A third light source emits a third color, which illuminates a third portion of the FOV of the barcode reader. A fourth light source emits a fourth color, which illuminates a fourth portion of the FOV of the barcode reader. The first light source and third light source have the same color. The second light source and the fourth light source have the same color. The first light source and the third light source have a color different from the second light source and the fourth light source. Each of the first portion, the second portion, the third portion, and the fourth portion of the FOV is square-shaped. A conjunction of the first portion, the second portion, the third portion, and the fourth portion creates a single square aiming pattern. The first portion, the second portion, the third portion, and the fourth portion are quadrants in the single square aiming pattern and are close together to form a FOV centerline in the form of cross or two centerlines where one is horizontal and the other is vertical. A contrast between the first color, the second color, the third color, and the fourth color creates an intuitive aiming pattern. An edge between the four square-shaped images created by the conjunction of the first portion, the second portion, the third portion, and the fourth portion identifies the FOV centerline.

Implementations of an embodiment of the present invention include a new and effective way to point a device at a target reusing components that usually are on board, reducing product costs and increasing compactness. A barcode scanner or reader may have two light emitting diodes (LEDs) that are aimed at a targeted object or barcode. The two LEDs may be green and red, and are used to provide visible feedback from a reading result. The green LED, also known as the Green Spot, is used to indicate a reading success, while the red LED, also known as the Red Spot, is used to indicate a reading failure or fail. In many scanners and readers, the green LED and the red LED are never turned on together. However, in implementations of embodiments of the present invention, the green LED and the red LED are turned on together.

In FIG. 1, an aiming system 100 shows a barcode reader 110 scanning or reading a barcode 120 in a field-of-view (FOV) 130. A first light source emits a first color in the form of a rectangular-shaped image 140 that overlays a top portion of barcode 120. A second light source emits a second color in the form of a rectangular-shaped image 150 that overlays a bottom portion of barcode 120. Images 140 and 150 are adjacent to one another such that a FOV centerline 160 appears indicating an optimal scanning or reading of barcode 120.

Barcode reader 110 can be any number of image readers or optical scanners that have multiple LEDs or lasers. Such devices can include the Matrix 210N LQL, Matrix 300N, Matrix 410N, and Matrix 450N by Datalogic S.P.A of Lippo di Calderara di Reno (BO)—Italy; Dataman 15x, Dataman 26x, Dataman 30x, and Dataman 36x by Cognex Corporation of Natick, Mass.; and QX Hawk, MicroHawk ID 20, MicroHAWK ID 30, and MicroHAWK ID 40 by Microscan Systems, Inc. of Renton, Wash. Barcode reader 110 can be other scanners or readers not listed here.

Barcode 120 is provided as the exemplary targeted object in aiming system 100. However, other types of targeted objects can be scanned or read in place of barcode 120. In aiming system 100, barcode 120 is a two-dimensional barcode. In other implementation of embodiments, barcode 120 can be a one-dimensional barcode or other type of symbol.

FOV 130 is what barcode reader 110 can observe at a given moment. As shown, FOV 130 is the maximum visual coverage that can be scanned or read by barcode reader 110. In implementations of embodiments of the present invention, FOV 130 changes depending on the distance between barcode reader 110 and barcode 120. As barcode reader 110 moves closer to barcode 120, FOV 130 becomes smaller. As barcode reader 110 moves away from barcode 120, FOV 130 becomes larger. However, in an optical system, there are limits on a FOV that are indicated by minimum and maximum distances for effectiveness.

Although not shown, barcode reader 110 has two light sources that can exist in the form of LEDs or lasers. Additionally, barcode reader 110 may implement toroidal lenses (not shown) to aid in the emission of the lights from the LEDs towards the targeted object. In implementations of embodiments of the present invention, toroidal lenses can be used to obtain a rectangular-shaped image or color projected onto the targeted object such as barcode 120. In other embodiments, a toroidal lens may not be used, or another type lens may be implemented. The idea here is that images 140 and 150 originate from light sources within barcode reader 110. The light sources can be two LEDs or lasers. The light sources must be properly placed and optically conditioned in order to generate rectangular-shaped images 140 and 150.

Rectangular-shaped image 140 has a different color from rectangular-shaped image 150. In some embodiments, image 140 may have the color green while image 150 may have the color red. Both images 140 and 150 appear simultaneously over barcode 120 where the adjacent boundary between images 140 and 150 is an edge called FOV centerline 160. Due to the contrast in colors between images 140 and 150, FOV centerline 160 is highly visible and provides an optimal aiming pattern to scan or read a targeted object such as barcode 120. So, whenever a user wants to scan an object quickly, the user can align FOV centerline 160 over the targeted object and get a fast scan or read.

Although FOV centerline 160 is shown in a horizontal position along the optical axis from barcode reader 110, the light sources could be arranged in barcode reader 110 to be in a horizontal plane such that the rectangular images are shown in a 90 degree or vertical position from the one shown in FIG. 1. As such, FOV centerline 160 could become a vertical optical scanning pattern rather than the one currently shown.

Figure 2:
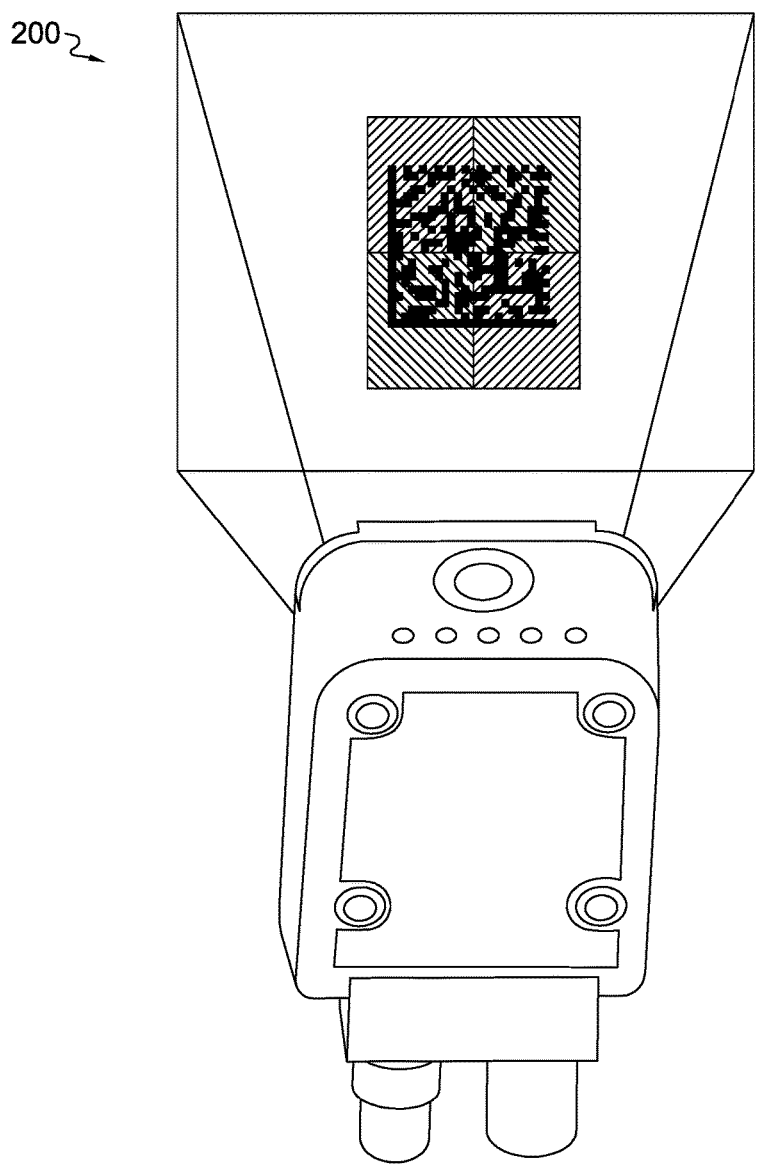
FIG. 2 is another exemplary illustration of an optical scanning system scanning an image, implemented in accordance with an embodiment of the present invention.

Turning to FIG. 2, a more complex and interesting shape can be obtained by using four LEDs. In aiming system 200, a barcode reader 210 is shown scanning or reading a barcode 220 in a field-of-view (FOV) 230. Barcode 220 is similar to barcode 120 and FOV 230 is similar to FOV 130. A first light source emits a first color in the form of a rectangular-shaped image 240 that overlays a top left portion of barcode 220. A second light source emits a second color in the form of a rectangular-shaped image 245 that overlays a bottom left portion of barcode 220. A third light source emits a third color in the form of a rectangular-shaped image 250 that overlays a bottom right portion of barcode 220. A fourth light source emits a fourth color in the form of a rectangular-shaped image 255 that overlays a top right portion of barcode 220. Images 240 and 250 have the same color while images 245 and 255 have the same color. The color for images 240 and 250 is different from the color for images 245 and 255. In implementations of embodiments of the present invention, the color emitted by the light sources is green or red.

Images 240, 245, 250, and 255 are substantially square-shaped. Images 240, 245, 250, and 255 are positioned to form a single square aiming pattern where images 240, 245, 250, and 255 form quadrants in the single square aiming pattern. At the edges between adjacent images, a horizontal centerline 260 and a vertical centerline 265 are formed creating a cross. Centerlines 260 and 265 indicate an intuitive aiming pattern because of the contrast between colors at the edges of images 240, 245, 250, and 255. Centerlines 260 and 265 are also referred to as an FOV centerline.

The preferred implementation concept is based on an LED with a rectangular diaphragm and a collimator lens for each color component. In the implementation of an embodiment of the present invention, the distance between light sources must be considered so that the optical elements can be optimized along with their geometry to maximize the "edge effect" on the entire system depth of field (DOF). One way to achieve optimization is to consider different degrees of overlap between light images on a targeted object at various distances. For example, at a small distance from the barcode reader to the targeted object, the light images do not overlap and a large area or "hole" may be the FOV centerline between the light images.

It is possible to fix the distance between a reader and a target. However, color overlapping can be optimized for different purposes. By minimizing the space between two rectangular color images, the best centerline can be indicated in the FOV. By initially maximizing the space between two rectangular color images at an initial distance, an optimal reading distance can be achieved by pulling the reader away from the target, thus, allowing the two rectangular color images to converge until the best centerline indication is achieved, which also provides the optimal reading distance.

From an application point of view, aiming systems are typically used in two scenarios, during the reader installations and in presentation mode. The second scenario is more complex because it combines the aiming functionality with the feedback light images. Particularly, the proposed solution is to keep both the green and red images turned on until the reading is completed. Then, the LED color that does not respond to the reading result can be turned off.

As an example, an application of an implementation of embodiments of the present invention includes the following. The application is based on two toroidal lenses placed beyond a green and a red LED with the purpose of generating a rectangular lighting profile along planes perpendicular to the optical axis. Such application has been optimized for a receiving optical system consisting of a 7 millimeter (mm) lens and a 1280×960 sensor (pixel pitch 3.75 micrometer (μm)), for a horizontal angular field-of-view (FOV) of 38 degrees. The optical lighting system is composed of the following elements: 1 LED Lumileds LUXEON Z Color Line—green, by Lumileds of Schipol, Netherlands; 1 LED Lumileds LUXEON Z Color Line—red orange, by Lumileds of Schipol, Netherlands; and 2 plano-convex toroidal lenses. The main features of the components are summarized in the tables.

TABLE 1

| characteristics of the light sources LED | | | |
|---|---|---|---|
| Color | Dominant wavelength (nm) | Luminous flux @ 500 mA (lm) | Viewing angle |
| Green | 520-540 | 80-114 | 145 |
| Red orange | 614-624 | 40-64 | 145 |

TABLE 2

| characteristics of the plano-convex toroidal lenses LENS | | | | | | |
|---|---|---|---|---|---|---|
| Material | Y Half-Width (mm) | X Half-Width (mm) | Thickness (mm) | Rotation R2 (mm) | Radius2 (mm) | Conic2 |
| Polycarbonate | 2 | 2 | 2 | −15 | −3 | −0.678 |

Figure 3:
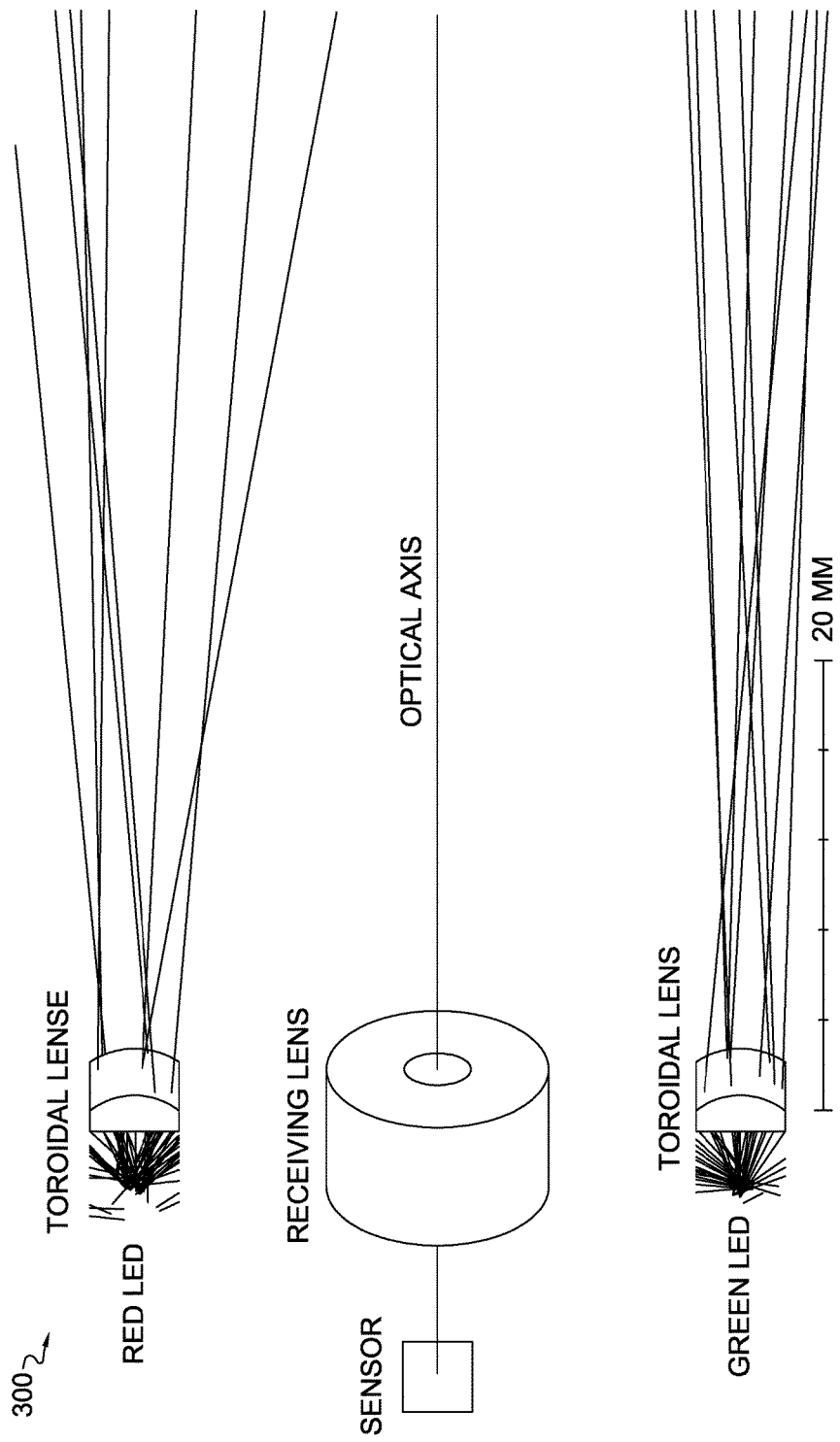
FIG. 3 is an exemplary optical scanning system illustrating the dispersion of light and reception of an image along the optical axis, implemented in accordance with an embodiment of the present invention.

In FIG. 3, an optical system 300 is shown. The distance along the Y axis at the center of the two LEDs 310 and 315 (and the center of the two toroidal lenses 320 and 325) is 27 mm. LEDs 310 and 315 and toroidal lenses 320 and 325 are aligned to receiving lens 340 with respect to optical axis 345, which is also the X axis. LEDs 310 and 315 and toroidal lenses 320 and 325 are displaced at the same distance from the center of receiving lens 340, which is 13.5 mm. The distance between LEDs 310 and 315 and toroidal lenses 320 and 325 along the Z axis is equal to 4 mm. Sensor 350 is displaced with its longer side along the X axis, and toroidal lenses 320 and 325 have a shorter radius of curvature in the Y-Z plane. This configuration produces a rectangular lighting profile (330 and 335) with the shorter side of the rectangle displaced along the Y axis and the longer side displaced along the X axis.

Continuing with FIG. 3, the light pattern generated by optical system 300 diverges along both X and Y directions. Therefore, increasing the distance along optical axis 345, the dimension of the rectangles increases. At short distances, the green and the red rectangles are separated by a no-light region. For distances greater than 140 mm, the two rectangles start to overlap, generating a yellow overlapping region of increasing dimension as distance along the X axis increases.

Optical simulations have been performed at different distances with respect to receiving lens 340. For very small distances, the separation region between rectangles 330 and 335 is considerable, and this could imply poor precision in the aiming process. The same issue can happen for very large distances, where the overlapping region has a large dimension. For implementations of embodiments of the invention, a range of 80-400 mm is an optimal working range.

Figure 4:
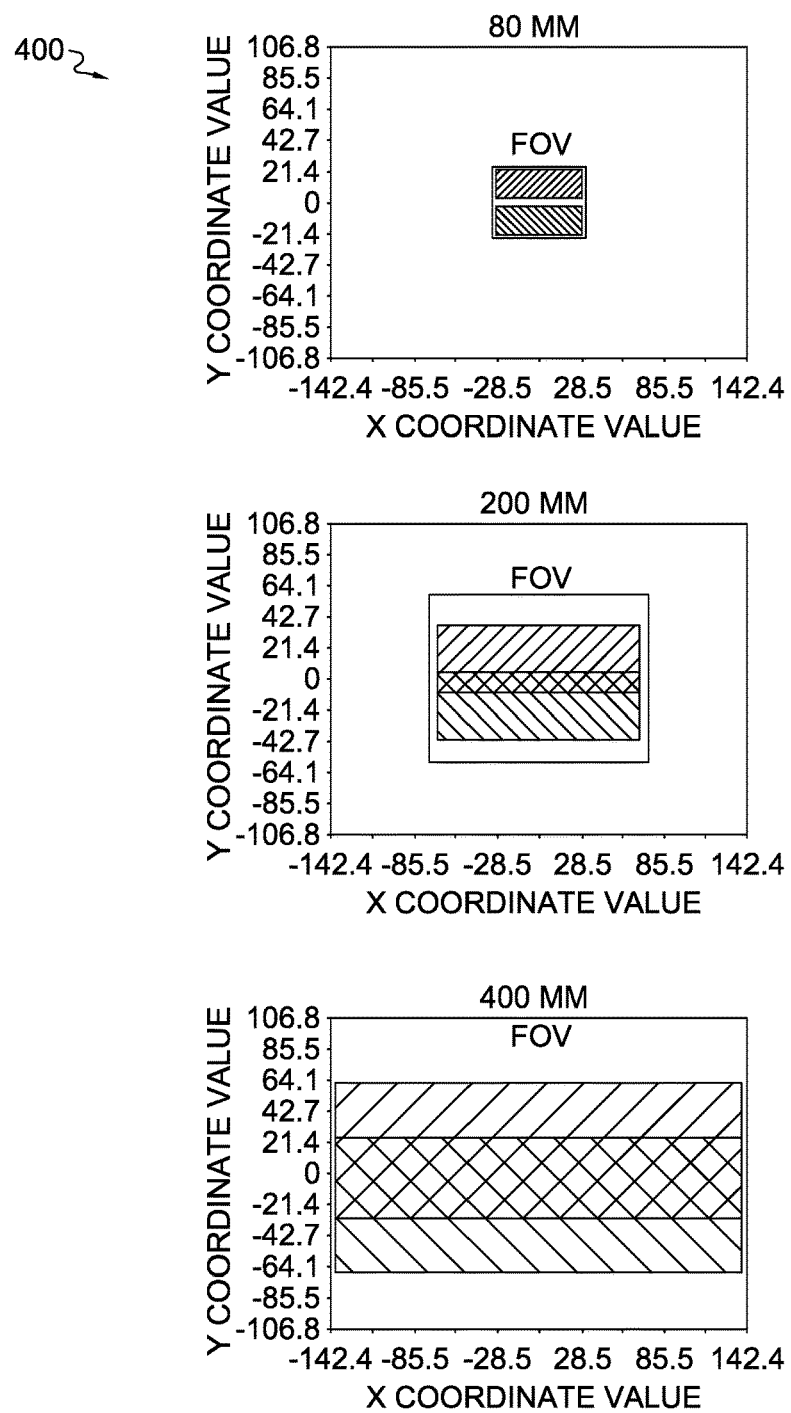
FIG. 4 is an illustration of scanned images from the optical scanning system in FIG. 3 using a FOV at 400 mm at distances of 80, 200, and 400 mm, implemented in accordance with an embodiment of the present invention.
Figure 5:
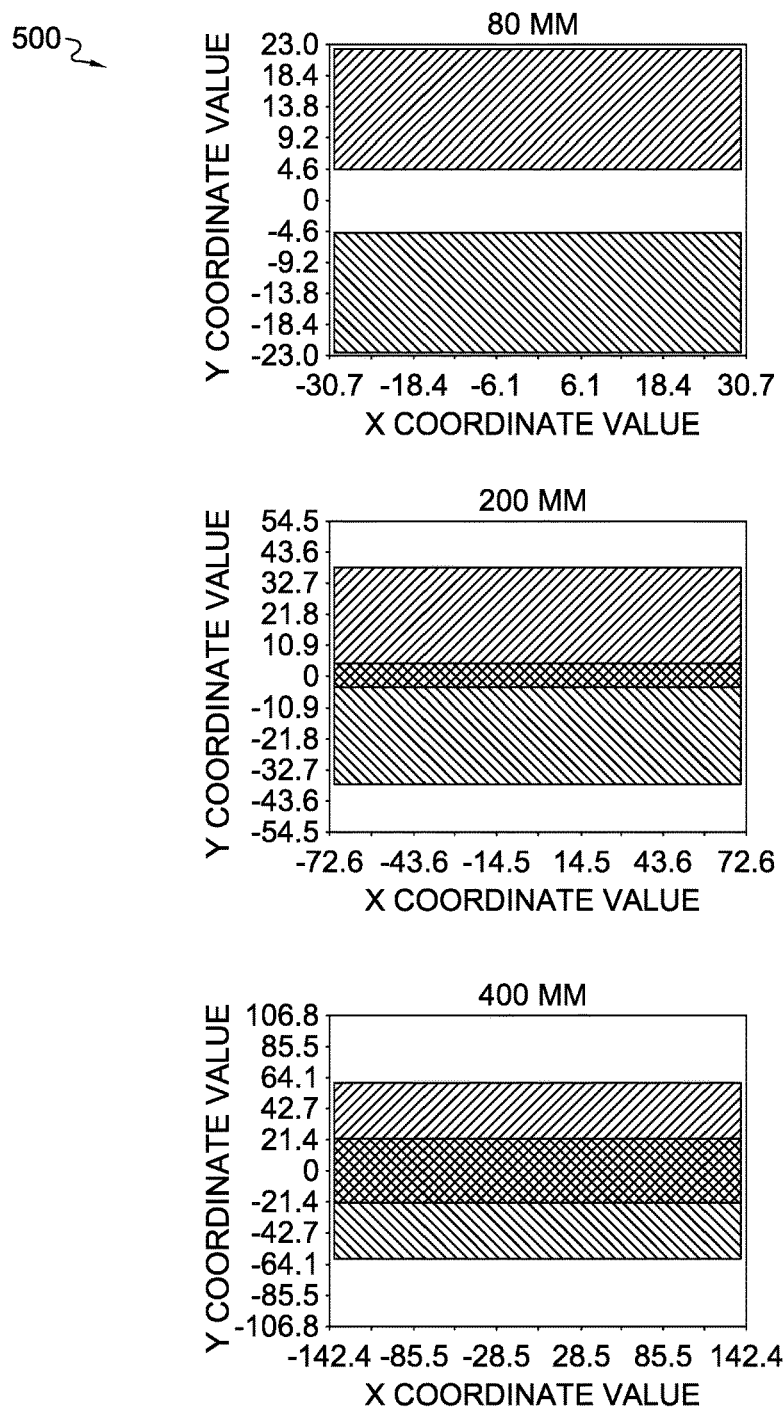
FIG. 5 is an illustration of scanned images from the optical scanning system in FIG. 3 using a FOV at 80 mm at distance of 80 mm, FOV at 200 mm at a distance of 200 mm, and FOV at 400 mm at a distance of 400 mm, implemented in accordance with an embodiment of the present invention.
Figure 6:
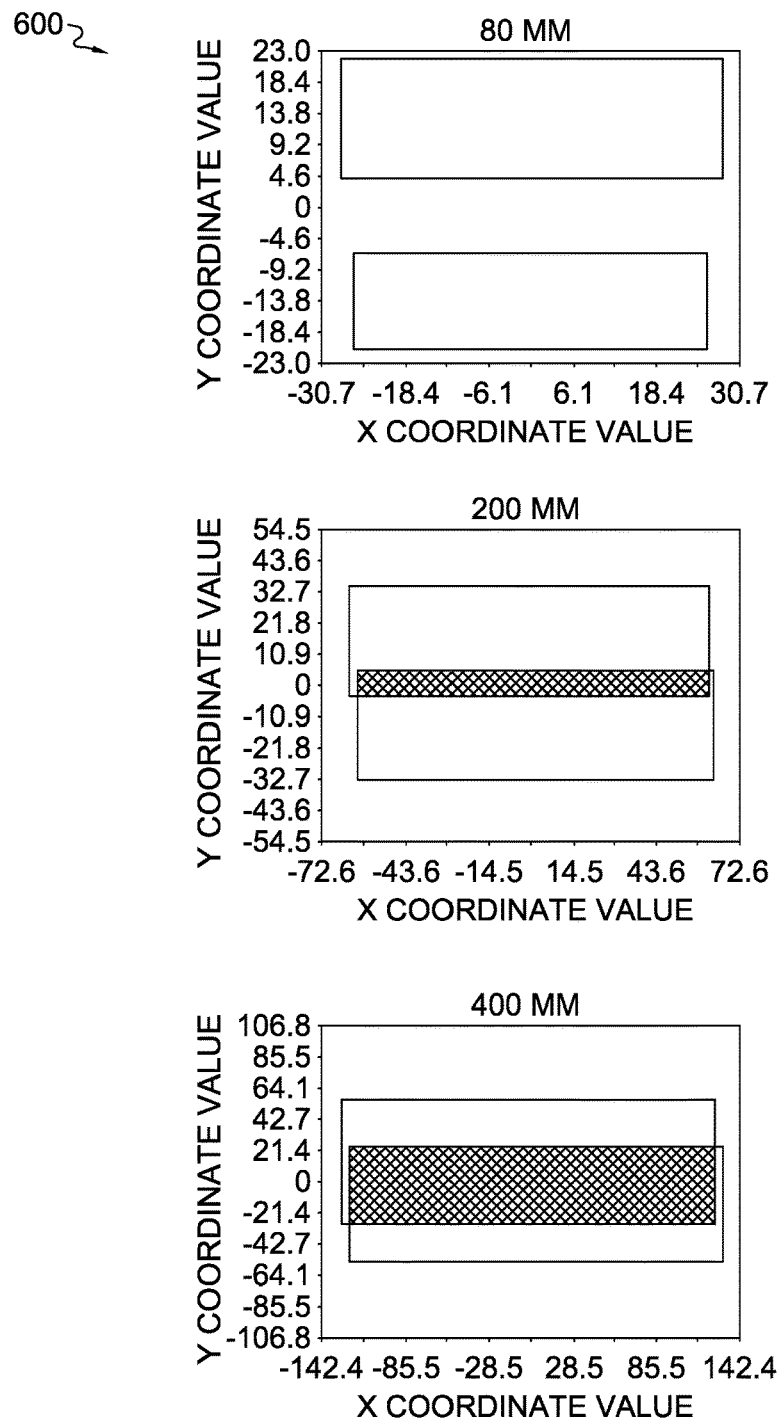
FIG. 6 is a schematic representation of scanned images in FIG. 5, implemented in accordance with an embodiment of the present invention.

In FIGS. 4, 5, and 6, simulated light profiles 400, 500, and 600 at three distances (80, 200, and 400 mm) are shown. The simulations have been performed setting a detector color at the indicated distances. In FIG. 4, the dimension of each detector has been set as the dimension of the FOV at 400 mm. Profile 410 shows rectangular images at a distance at 80 mm. As one can see, there is a gap between the rectangular profiles. Profile 420 shows rectangular images at a distance of 200 mm. Here, there is a slight overlap of the rectangular images. Profile 430 shows rectangular images at a distance of 400 mm. A significant overlap of the rectangular occurs at such distance. In FIG. 5, each detector has the dimension of the FOV at the corresponding distance. Profiles 510, 520, and 530 show rectangular images at their respective distances. Similar to FIG. 4, a gap between rectangular images appear at a distance of 80 mm. A slight overlap of the rectangular images appears at a distance of 200 mm. A significant overlap appears at a distance of 400 mm. The same scenario is presented FIG. 6, but with a schematic representation of the rectangular profiles. Profiles 610, 620, and 630 are similar to profiles 510, 520, and 530, but in schematic form.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. An aiming light system for a barcode reader, comprising:
   a first light source emitting a first color, which illuminates a first portion of a field of view (FOV) of the barcode reader;
   a second light source emitting a second color, which illuminates a second portion of the FOV of the barcode reader;
   wherein the first light source and the second light source have different colors;
   wherein each of the first portion and the second portion of the FOV is an image, wherein a conjunction of the first portion and the second portion creates a single aiming pattern, and wherein a contrast between the first color and the second color creates an intuitive aiming pattern;
   wherein an edge between the two images created by the conjunction of the first portion and the second portion identifies a FOV centerline,
   a third light source emitting a third color, which illuminates a third portion of the FOV of the barcode reader;
   a fourth light source emitting a fourth color, which illuminates a fourth portion of the FOV of the barcode reader;
   wherein the third light source has a same color as the first light source or has a different color from all other light sources in the aiming light system;
   wherein the fourth light source has a same color as the second light source or has a different color from all other light sources in the aiming light system; and
   wherein the first portion, the second portion, the third portion, and the fourth portion are quadrants that are close together to form a new FOV centerline in the form of a cross or two centerlines where one is horizontal and the other is vertical.

2. The aiming light system of claim 1, further comprising each of a plurality of toroidal lenses placed in front of the respective first light source, the second light source, the third light source, and the fourth light source, whereby the respective lights emitted by the respective light sources respectively generate the four images.

3. The aiming light system of claim 1, wherein the image is rectangular-shaped, and wherein the conjunction of the first portion, the second portion, the third portion, and the fourth portion creates a single rectangular aiming pattern.

4. The aiming light system of claim 1, wherein the first color is green and the second color is red.

5. The aiming light system of claim 1, wherein the first color and third color are green, and the second color and fourth color are red.

6. A method of improving an aiming pattern in a barcode reader having at least two light sources, where a first light source emits a green color to indicate a reading success and a second light source emits a red color to indicate a reading failure, wherein when a light source is turned on the other light source is turned off, comprising:
   modifying the barcode reader such the first light source and the second light source emit respectively the green color and the red color simultaneously, wherein the green color and the red color hit and illuminate a targeted object;
   modifying the barcode reader further so that each of the first light source and the second light source emits an image with the respective green color and red color;
   aligning the first light source and the second light source in the barcode reader so that the image with the green color is adjacent to the image with the red color to provide a field-of-view (FOV) centerline between the two colors;
   reading the green color and the red color in the FOV of the barcode reader, wherein an optimal reading is performed when the FOV centerline hits the targeted object,
   adding a third light source and fourth light source to the barcode reader, wherein the third light source and the fourth light source emit respectively the green color and the red color simultaneously with the first light source and the second light source;
   modifying the barcode reader so that each of the first light source, the second light source, the third light source, and the fourth light source emits an image;
   aligning the first light source in the barcode reader so that it is diagonally opposite the third light source, and the second light source is diagonally opposite the fourth light source, wherein the images of the light sources are quadrants that are close together to form a new FOV centerline in the form of a cross or two centerlines where one is horizontal and the other is vertical; and
   reading the green colors and the red colors in the FOV of the barcode, wherein the optimal reading is performed when the new FOV centerline hits the targeted object.

7. The method of claim 6, wherein modifying the barcode reader comprises programming one or more software modules.

8. The method of claim 6, wherein aligning the first light source and the second light source comprising adjusting the position of the light sources and optically conditioning the light sources to generate the adjacent images at a specified distance with clarity.

9. The method of claim 8, wherein the images are rectangular-shaped.

10. The method of claim 6, further comprising modifying the barcode reader further so that each of the first light source, the second light source, the third light source, and the fourth light source emits an image by implementing at least one toroidal lens in front of each light source so that the light sources emit the images.

11. The method of claim 10, wherein the images are rectangular-shaped.

12. An aiming light system for a barcode reader, comprising:
- a first light source emitting a first color, which illuminates a first portion of a field of view (FOV) of the barcode reader;
- a second light source emitting a second color, which illuminates a second portion of the FOV of the barcode reader;
- a third light source emitting a third color, which illuminates a third portion of the FOV of the barcode reader;
- a fourth light source emitting a fourth color, which illuminates a fourth portion of the FOV of the barcode reader;
- wherein the first light source and the third light source have a same color, the second light source and the fourth light source have a same color, and the first light source and the third light source have a color different from the second light source and the fourth light source;
- wherein each of the first portion, the second portion, the third portion, and the fourth portion of the FOV is substantially square-shaped, wherein a conjunction of the first portion, the second portion, the third portion, and the fourth portion creates a single square aiming pattern, wherein the first portion, the second portion, the third portion, and the fourth portion are quadrants in the single square aiming pattern that are close together to form a FOV centerline in the form of a cross or two centerlines where one is horizontal and the other is vertical, and wherein a contrast between the first color, the second color, the third color, and fourth color creates an intuitive aiming pattern; and
- wherein an edge between the four substantially square-shaped images created by the conjunction of the first portion, the second portion, the third portion, and the fourth portion identifies the FOV centerline.

13. The aiming light system of claim 12, further comprising each of four toroidal lenses placed in front of the respective first light source, the second light source, the third light source, and the fourth light source, whereby the respective lights emitted by the respective light sources respectively generate the four substantially square images.

14. The aiming light system of claim 13, wherein the first color and third color are green, and the second color and fourth color are red.

* * * * *